United States Patent
Barton et al.

(10) Patent No.: US 8,707,369 B2
(45) Date of Patent: Apr. 22, 2014

(54) RECOMMENDED RECORDING AND DOWNLOADING GUIDES

(75) Inventors: James Barton, Alviso, CA (US); Adam Feder, Mountain View, CA (US); Brian Beach, Columbus, IN (US)

(73) Assignee: TiVo Inc., Alviso, CA (US)

( * ) Notice: Subject to any disclaimer, the term of this patent is extended or adjusted under 35 U.S.C. 154(b) by 0 days.

(21) Appl. No.: 11/649,444

(22) Filed: Jan. 3, 2007

(65) Prior Publication Data
US 2007/0220554 A1    Sep. 20, 2007

Related U.S. Application Data

(60) Provisional application No. 60/778,596, filed on Mar. 1, 2006.

(51) Int. Cl.
*G04F 3/00* (2006.01)
*G04F 13/00* (2006.01)
*H04N 5/445* (2011.01)

(52) U.S. Cl.
USPC .......................................... 725/58; 386/261

(58) Field of Classification Search
USPC ......... 725/34–35, 40, 45–46, 51, 53, 68, 100, 725/115, 92, 131, 134, 142, 151, 153, 141, 725/133, 58, 8; 386/261
See application file for complete search history.

(56) References Cited

U.S. PATENT DOCUMENTS

| | | | |
|---|---|---|---|
| 5,541,738 A | 7/1996 | Mankovitz | |
| 5,790,935 A * | 8/1998 | Payton | 725/91 |
| 5,828,419 A | 10/1998 | Bruette et al. | |
| 6,118,744 A | 9/2000 | Sturgeon et al. | |
| 6,269,216 B1 | 7/2001 | Abecassis | |
| 6,351,596 B1 | 2/2002 | Ostrover | |
| 6,564,005 B1 | 5/2003 | Berstis | |
| 6,732,367 B1 | 5/2004 | Ellis | |
| 6,898,762 B2 | 5/2005 | Ellis et al. | |

(Continued)

FOREIGN PATENT DOCUMENTS

| | | |
|---|---|---|
| CN | 1479522 | 3/2004 |
| JP | 2002-199316 | 7/2002 |

(Continued)

OTHER PUBLICATIONS

International Searching Authority, "International Search Report", PCT/US07/03129, 3 pages.

(Continued)

*Primary Examiner* — Yassin Alata
(74) *Attorney, Agent, or Firm* — Hickman Palermo Truong Becker Bingham Wong LLP

(57) ABSTRACT

Techniques for recommending recording and/or downloading suggestions to a DVR user are provided. According to one technique, a list of suggestions is received from a recommending entity. Each of the suggestions identifies either to-be-broadcasted content or downloadable content. The entity is mapped to the list, thereby establishing an entity-to-list mapping. Data, which indicates a user's selection of a list, is received. The user's DVR is mapped to the selected list, thereby establishing a DVR-to-list mapping. Based on this mapping, one or more candidate items are automatically selected from among a set of items. Identities of the candidate items are sent to the DVR. The recommending entity does not own or operate the DVR.

24 Claims, 7 Drawing Sheets

(56) References Cited

U.S. PATENT DOCUMENTS

| | | | |
|---|---|---|---|
| 6,922,843 B1 | 7/2005 | Herrington et al. | |
| 6,973,461 B1 | 12/2005 | Fleming et al. | |
| 6,990,635 B2 | 1/2006 | Kurapati et al. | |
| 7,013,290 B2 | 3/2006 | Ananian | |
| 7,051,352 B1 | 5/2006 | Schaffer | |
| 7,065,709 B2 | 6/2006 | Ellis et al. | |
| 7,206,497 B1* | 4/2007 | Boyle et al. | 386/83 |
| 7,337,219 B1 | 2/2008 | Meenan et al. | |
| 7,403,692 B2 | 7/2008 | Son | |
| 7,503,055 B2 | 3/2009 | Reynolds et al. | |
| 7,861,258 B2 | 12/2010 | Barton | |
| 2002/0100047 A1 | 7/2002 | Matoba et al. | |
| 2002/0147782 A1 | 10/2002 | Dimitrova et al. | |
| 2002/0174430 A1 | 11/2002 | Ellis et al. | |
| 2002/0174433 A1 | 11/2002 | Baumgartner et al. | |
| 2003/0014751 A1 | 1/2003 | Paek | |
| 2003/0154485 A1* | 8/2003 | Johnson et al. | 725/89 |
| 2003/0163811 A1 | 8/2003 | Luehrs | |
| 2003/0172377 A1 | 9/2003 | Johnson | |
| 2003/0188307 A1 | 10/2003 | Mizuno | |
| 2003/0204848 A1 | 10/2003 | Cheng et al. | |
| 2003/0229898 A1 | 12/2003 | Babu et al. | |
| 2003/0231859 A1 | 12/2003 | Son | |
| 2004/0003413 A1 | 1/2004 | Boston et al. | |
| 2004/0006698 A1* | 1/2004 | Apfelbaum | 713/182 |
| 2004/0008972 A1* | 1/2004 | Haken | 386/83 |
| 2004/0098743 A1* | 5/2004 | Gutta et al. | 725/46 |
| 2004/0210926 A1 | 10/2004 | Francis et al. | |
| 2004/0244030 A1 | 12/2004 | Boyce et al. | |
| 2004/0261096 A1 | 12/2004 | Matz | |
| 2005/0012859 A1 | 1/2005 | Adolph et al. | |
| 2005/0022229 A1 | 1/2005 | Gabriel et al. | |
| 2005/0028191 A1 | 2/2005 | Sullivan et al. | |
| 2005/0076359 A1 | 4/2005 | Pierson et al. | |
| 2005/0086356 A1* | 4/2005 | Shah et al. | 709/231 |
| 2005/0114340 A1* | 5/2005 | Huslak et al. | 707/10 |
| 2005/0149987 A1* | 7/2005 | Boccon-Gibod et al. | 725/135 |
| 2005/0155052 A1 | 7/2005 | Ostrowska et al. | |
| 2005/0251749 A1 | 11/2005 | Lamkin et al. | |
| 2005/0273819 A1 | 12/2005 | Knudson et al. | |
| 2005/0275758 A1 | 12/2005 | McEvilly et al. | |
| 2006/0045479 A1 | 3/2006 | Hayashi | |
| 2006/0215990 A1* | 9/2006 | Proebstel | 386/83 |
| 2006/0282847 A1 | 12/2006 | Gupte | |
| 2007/0033607 A1 | 2/2007 | Bryan | |
| 2007/0186234 A1 | 8/2007 | Cormack et al. | |
| 2007/0204287 A1 | 8/2007 | Conradt et al. | |
| 2007/0212025 A1 | 9/2007 | Barton et al. | |
| 2007/0214473 A1 | 9/2007 | Barton | |
| 2007/0220554 A1 | 9/2007 | Barton | |
| 2008/0034391 A1 | 2/2008 | Lehman et al. | |
| 2011/0067048 A1 | 3/2011 | Barton | |
| 2014/0033245 A1 | 1/2014 | Barton | |

FOREIGN PATENT DOCUMENTS

| | | |
|---|---|---|
| JP | 2002-218363 | 8/2002 |
| JP | 2002-232823 | 8/2002 |
| JP | 2003-299023 | 10/2003 |
| JP | 2005-510140 | 4/2005 |
| JP | 2005-339700 | 12/2005 |
| JP | 2006-186981 | 7/2006 |
| WO | WO2004/003879 A2 | 1/2004 |
| WO | WO 2007/106260 | 9/2007 |

OTHER PUBLICATIONS

Claims, PCT/US07/03129, 6 pages.
"Examiner's first report on patent application No. 2007225374," Pizzey's, Dec. 15, 2009, 3 pages.
Claims, application No. 2007225374, 6 pages.
Australian Government, IP Australia, "Examiner's first report on patent application No. 2007224180," Apr. 15, 2010, 3 pages.
Pending Claims, patent application No. 2007224180, 11 pages.
Australian Government, IP Australia, "Examiner's second report on patent application No. 2007225374," Apr. 7, 2010, 4 pages.
Pending Claims, patent application No. 2007225374, 5 pages.
Office Action from Chinese patent application No. 200780007271.8, mail date Feb. 5, 2010, 8 pages.
Current claims for Chinese patent application No. 200780007271.8, 6 pages.
"Reporting First Office Action on above-identified Chinese Patent Application," Boss & Young, Mar. 16, 2010, 10 pages.
"Current claims as amended and submitted under Article 19 of PCT," 10 pages.
The State Intellectual Property Office of the People'S Republic of China, Notification of the Second Office Action dated Feb. 23, 2011 (Eng. Translation), Chinese Patent App. No. 200780007271.8, 7 pages.
Current Pending Claims of Chinese Patent App. No. 200780007271.8 as of Feb. 23, 2011 (Eng. Translation), 6 pages.
International Bureau of WIPO Notification Concerning Transmittal of Copy of International Preliminary Report on Patentability for International Application No. PCT/US2007/003129 mailed Sep. 12, 2008, 6 pages, International Bureau of WIPO, 34, chemin des Colombettes, 1211, Geneva 20, Switzerland.
Japan Patent Office Notification of Reason for Rejection for Japanese Patent Application No. 2008-557270 mailed May 17, 2011, 4 pages, Japan.
Current Claims as of May 17, 2011 for Japanese Patent Application No. 2008-557270, 4 pages.
European Patent Office Extended Search Report and Written Opinion for European Application No. 07750022.1-1241/1996994 mailed Jul. 28, 2011, 7 pages, European Patent Office, Postbus 5818, 2280 HV Rijswijk, Netherlands.
Current Claims as of Jul. 28, 2011 for European Application No. 07750022.1-1241/1996994, 7 pages.
Canadian Intellectual Property Office Office Action for Canadian Application No. 2,641,750 mailed Oct. 31, 2011, 3 pages, Canada.
Current Claims as of Oct. 31, 2011 for Canadian Application No. 2,641,750, 6 pages.
State Intellectual Property Office of the People's Republic of China Notification of the Third Office Action for Chinese Application No. 200780007271.8 mailed Aug. 31, 2011, 8 pages, Beijing, China.
Current Claims as of Aug. 31, 2011 for Chinese Application No. 200780007271.8, 8 pages.
International Searching Authority, "International Search Report", PCT/US07/03129, received Feb. 25, 2008, 3 pages.
International Searching Authority, "International Search Report", PCT/US2007/05314, received Feb. 22, 2008, 3 pages.
Claims, PCT/US2007/05314 as of Feb. 22, 2008, 12 pages.
International Searching Authority, "International Search Report", International application No. PCT/US07/05458, dated Jun. 17, 2008, 10 pages.
Claims, International application No. PCT/US07/05458 as of Jun. 17, 2008, 3 pages.
Office Action from Australian patent application No. 2007224155, mail date Feb. 9, 2010, 3 pages.
Current claims for Australian patent application No. 2007224155 as of Feb. 9, 2010, 4 pages.
Canadian Intellectual Property Office Office Action for Canadian Application No. 2,645,570 mailed Nov. 26, 2010, 2 pages.
Claims as of Nov. 26, 2010 for Canadian Application No. 2,645,570, 5 pages.
Canadian Intellectual Property Office Office Action for Canadian Application No. 2,641,843 mailed Aug. 9, 2011, 3 pages.
Claims as of Aug. 9, 2011 for Canadian Application No. 2,641,843, 11 pages.
Japan Patent Office "Notification of Reasons for Rejection" for Japanese Patent Application No. 2008-557420, mailed Oct. 25, 2011, 9 pages. (English Translation included).
Claims as of Oct. 25, 2011 in Japanese Patent Application No. 2008-557420, 5 pages.
Japan Patent Office "Notification of Reasons for Rejection" for Japanese Patent Application No. 2008-557388, mailed Oct. 25, 2011, 7 pages. (English Translation included).

(56) References Cited

OTHER PUBLICATIONS

Claims as of Oct. 25, 2011 in Japanese Patent Application No. 2008-557388, 9 pages.
The State Intellectual Property Office of the People's Republic of China, Notification of the Second Office Action, dated Nov. 25, 2011, Chinese Patent App. No. 200780014835.0, 8 pages. (English translation included).
Claims as of Nov. 25, 2011 in Chinese Patent App. No. 200780014835.0, 10 pages.
European Patent Office, Extended European Search Report in European Patent Application No. 07 752 041.9, dated Dec. 5, 2011, 9 pages.
Claims as of Dec. 5, 2011 in European Patent Application No. 07 752 041.9, 6 pages.
Japanese Patent Application No. 2008-557270, "Decision of Refusal", mailed Mar. 27, 2012, 6 pages.
Claims as of Mar. 27, 2012 in Japanese Patent Application No. 2008-557270, 3 pages.
The State Intellectual Property Office of the People's Republic of China, Notification of the First Office Action dated Jun. 23, 2010 (Eng. Translation), Chinese Patent App. No. 200780007446.5, 14 pages.
Current Pending Claims of Chinese Patent App. No. 20078000446.5 as of Jun. 23, 2010, 3 pages.
The State Intellectual Property Office of the People's Republic of China, Notification of the Second Office Action dated Dec. 31, 2011 (Eng. Translation), Chinese Patent App. No. 200780007446.5, 18 pages.
Current Pending Claims of Chinese Patent App. No. 20078000446.5 as of Dec. 31, 2011, 4 pages.
Australian Government, IP Australia, Patent Examination Report No. 1. In application No. 2011200014, dated Oct. 15, 2012, 3 pages.
Current Claims in application No. 2011200014, dated Oct. 2012, 2 pages.
European Patent Office, Extended European Search Report in European Patent Application No. 07 752 175.5, dated Nov. 24, 2011, 6 pages.
Claims as of Nov. 24, 2011 in European Patent Application No. 07 752 175.5, 2 pages.
The State Intellectual Property Office of the People's Republic of China "Notification of Decision of Rejection" received in Chinese patent application No. 200780007271.8, mail date Jun. 5, 2012, 7 pages.
European Patent Office, Office Action European patent application No. 07750022.1, mail date Jun. 5, 2012, 6 pages.
Claims as of Jun. 5, 2012 in European patent application No. 07750022.1, 6 pages.
The State Intellectual Property Office of the People's Republic of China "Notification of the Third Office Action" received in Chinese patent application No. 200780014835.0, mail date Sep. 6, 2012, 5 pages.
Claims as of Sep. 6, 2012, in Chinese Patent application No. 200780014835.0, 10 pages.
Canadian Intellectual Property Office, "Office Action", in application No. 2,641,750, dated Sep. 24, 2012, 2 pages.
Current Claims in application No. 2,641,750, dated, Sep. 2012, 5 pages.
Patent Examination Report No. 1, EP Application No. 2010257254, dated Sep. 17, 2013, 4 pages. (60097-0752).
Claims from EP Application No. 2010257254, dated Sep. 17, 2013, pages (60097-0752).
European Patent Office, Office Action dated Mar. 5, 2013, received in European Patent Application No. 07752175.5, 5 pages.
Claims as of Mar. 5, 2013 in European Patent Application No. 07752175.5, 3 pages.

\* cited by examiner

RECOMMENDED RECORDING AND DOWNLOADING GUIDES

CLAIM OF PRIORITY

The present application claims domestic priority to Provisional U.S. Patent Application No. 60/778,596, which was filed Mar. 1, 2006, and which is incorporated by reference herein.

FIELD OF THE INVENTION

The present invention relates to digital video recorders (DVRs).

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The introduction of the DVR to the consumer world has revolutionized the way viewers watch and record television programs. DVRs eliminate many of the complications of VCRs and the need for video tapes. DVRs record television programs on a hard drive that is capable of storing a large number of television programs. Because DVRs are usually box-like in shape, and are often found sitting on top of the television sets to which they are connected, DVRs typically are included in the broad category of devices now called "set-top boxes." Much like VCRs, DVRs receive one or more television signals (which may represent television programs and/or movies) as input from cables or satellite dishes, (or, in some cases, unlike VCRs, from broadband network connections) and also output television signals to a television set or other display.

A DVR's user can instruct the DVR to schedule, for recording, specified content that may be broadcasted or otherwise transmitted to the DVR at some future time. Thus, the user can schedule the automatic recording of the content in advance of the time that the DVR will receive the content. For example, the user can instruct the DVR to record unspecified content that will be broadcasted on a specified channel beginning at a specified date and time and ending at another specified time. For another example, the user can instruct the DVR to record a specified showing (on a specified channel, and beginning at a specified date and time) of a specified movie, specified event, or specified episode of a multi-episode television series. For another example, the user can instruct the DVR to record the next to-be-broadcasted instance of a specified movie, specified event, or specified episode of a multi-episode television series without specifying the date, time, or channel on which that instance will be broadcasted. For another example, the user can instruct the DVR to record all (or all first-run) episodes of a multi-episode television series on a specified channel without specifying the dates or times at which those episodes will be broadcasted. For another example, the user can instruct the DVR to record all (or all first-run) instances of movies, events, or episodes of a multi-episode television series that are associated with a specified keyword, a specified actor, and/or a specified director without specifying the titles, channels, or broadcasting times of those instances.

Although some modern DVRs give DVR users many options for programming those DVRs to record upcoming content in an automated manner, DVR users still may be overwhelmed by the enormous volume and variety of television programming that is available. Many DVR users have difficulty determining which televised content they want their DVRs to record. Some DVR users are largely unaware of televised content in which those users would be intensely interested if those users only knew of the existence of that content. DVR users may often feel like they are floating adrift in a vast sea of content without any reliable compass to guide them.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
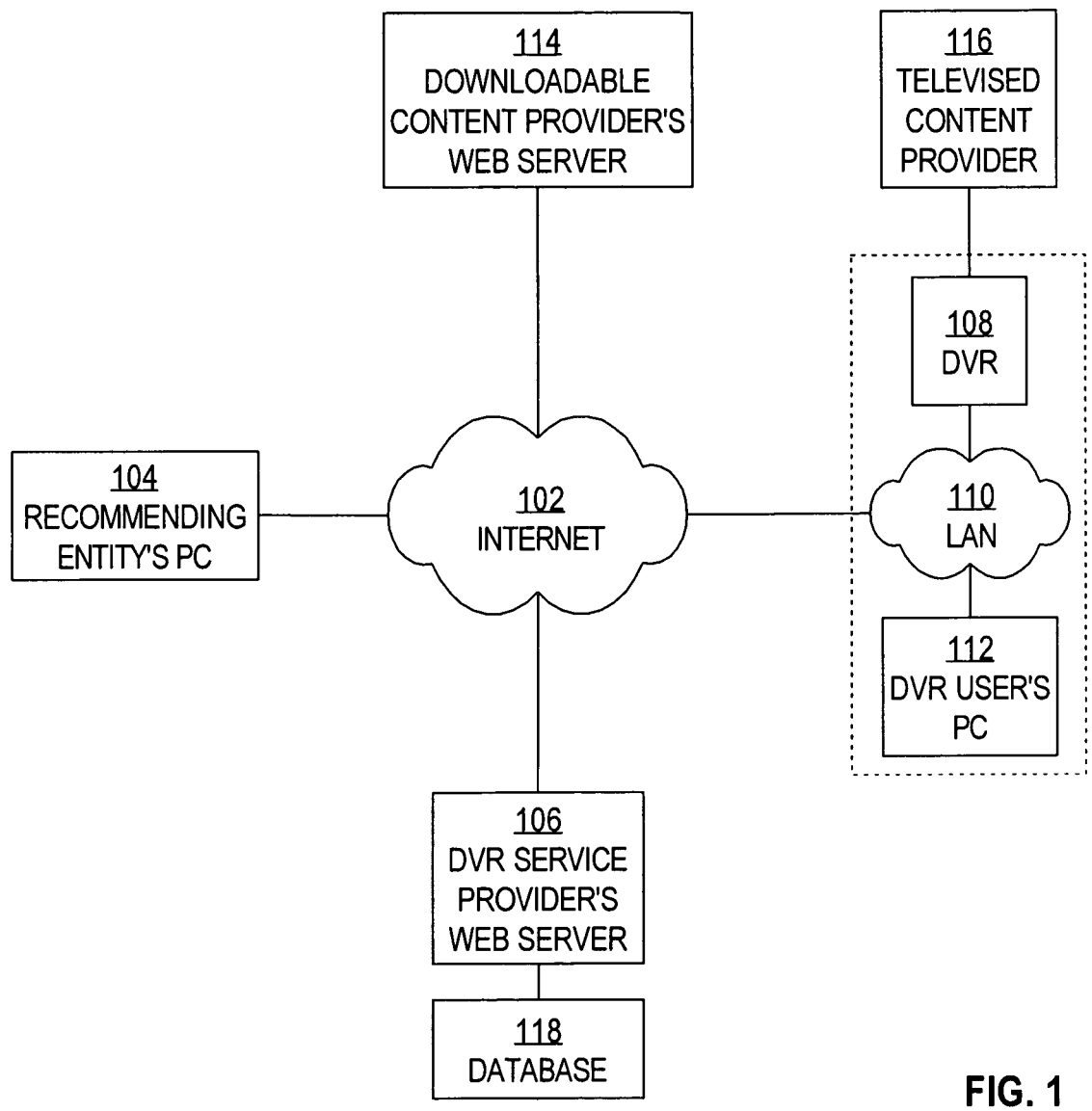
FIG. 1 is a block diagram that illustrates a system via which a DVR user can "subscribe" to a recommending entity's list of recommended recording and/or downloading suggestions, according to one embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the following discussion, in references to the drawings like numerals refer to like parts throughout the several views.

Embodiments are described herein according to the following outline:

1.0 General Overview
   2.0 System Structural Overview
   3.0 Example Techniques
   4.0 Recommended Suggestion-Dedicated DVRs
   5.0 Example DVR
   6.0 Implementation Mechanisms-Hardware Overview
1.0 General Overview Systems and techniques described herein assist DVR users in deciding which content those users' DVRs will record and/or download. According to one such technique, a recommending entity other than the DVR's user or owner sends, to a DVR service provider (e.g., TiVo Inc.), a list of one or more recommended recording and/or downloading suggestions. In many cases, the entity will be a well-known organization that has some widely recognized agenda or that caters to the special interests of a widely recognized and defined segment of the population (e.g., sports enthusiasts, video game enthusiasts, animation enthusiasts, car enthusiasts, body building enthusiasts, travel enthusiasts, music enthusiasts, shopping enthusiasts, food enthusiasts, pet owners, home owners, parents, women, men, adults, children, senior citizens, religious adherents, investors, political party affiliates, liberals, conservatives, singles, people with alternative lifestyles, etc.). In other cases, the entity may be an individual with some opinion concerning the content that DVRs ought to be recording and/or downloading.

For example, the list may include one or more titles, keywords, directors, actors, Uniform Resource Locators (URLs) (for downloadable content), TiVo IDs, etc., which the entity recommends (A TiVo ID is an object identifier that is assigned to content by TiVo, Inc. The TiVo ID provides an unambiguous "name" for episodes, series, movies, etc. Users can look up TiVo IDs for specified content using web services. TiVo IDs distinguish between different content items that have the same titles.). Thus, a recommended recording or downloading suggestion may comprise one or more criteria that content needs to satisfy in order to be considered content that the corresponding recommending entity recommends for recording or downloading. The list may include instances of specified movies, events, multi-episode televised series, specific episodes of such series, and/or downloadable files. The recommended recording and/or downloading suggestions may be directed towards the interests of the kinds of people who are typical members of or otherwise associated with the recommending entity. The DVR service provider may receive the list of recommended recording and/or downloading suggestions from the recommending entity through any of a variety of means. For example, a recommending entity may submit a list of recommended suggestions to the DVR service provider over the Internet via the DVR service provider's web site. For another example, a recommending entity may call the DVR service provider, or an employee thereof, and vocally convey the list to the DVR service provider over the telephone. The DVR service provider may establish and store (e.g., in a database) a mapping between the recommending entity and the list of recommended recording and/or downloading suggestions.

Figure 5:
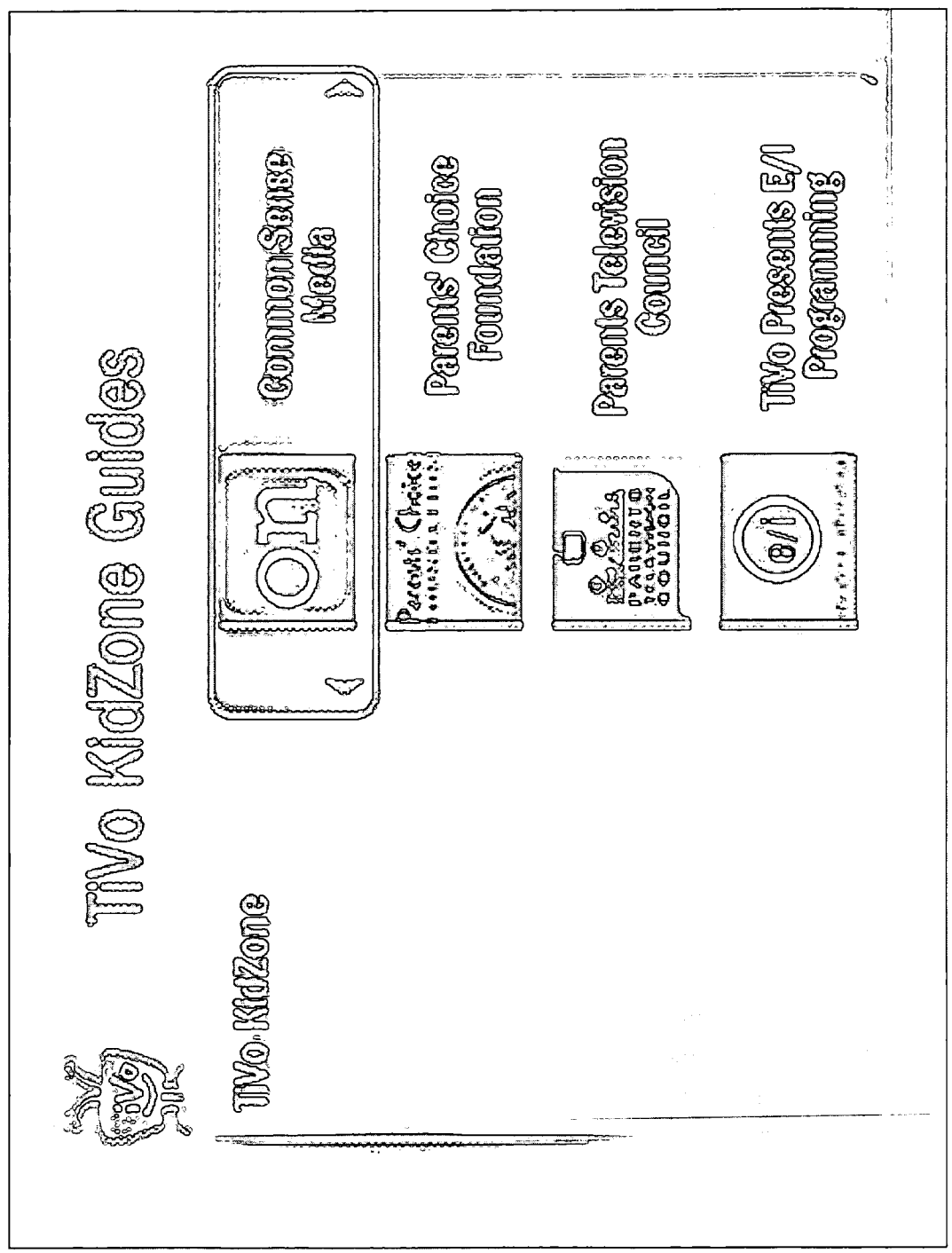
FIG. 5 shows a list of recommending entities that might be displayed by a DVR, according to an embodiment of the invention.

Over time, the DVR service provider may receive such lists from multiple different recommending entities and establish a separate recommending entity-to-list mapping for each such recommending entity. The DVR service provider may indicate, on an Internet-accessible web page or DVR-presented screen, the identities (e.g., names) of the recommending entities that are mapped to lists of recommended suggestions. For example, FIG. 5 shows a list of recommending entities that might be displayed by a DVR, according to an embodiment of the invention. The list shown in FIG. 5 includes recommending entities "Common Sense Media," "Parents' Choice Foundation," "Parents Television Council," and "TiVo Presents E/I Programming."

Figure 6:
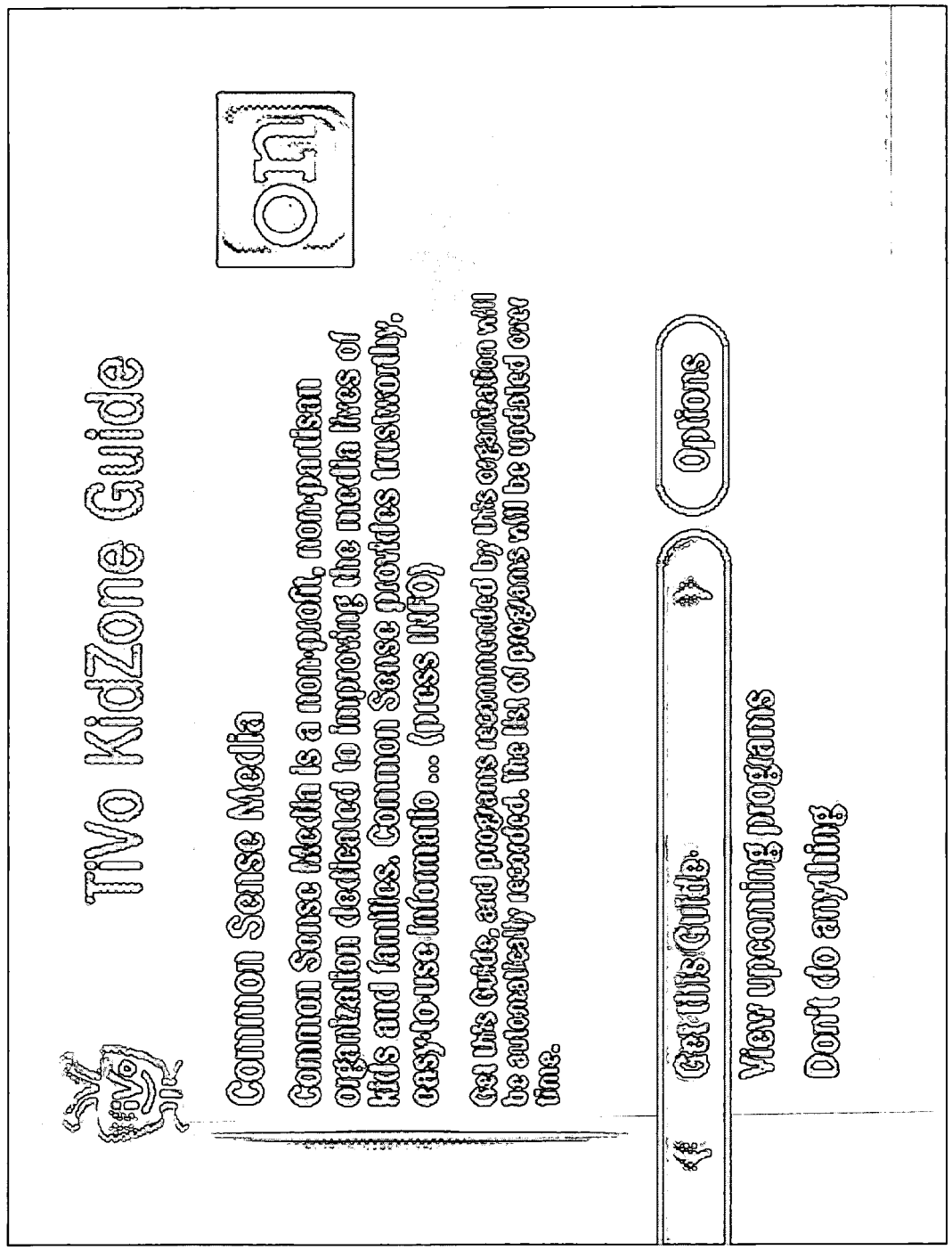
FIG. 6 shows an example of a DVR-presented screen that provides additional information about a selectable recommending entity, according to an embodiment of the invention.

In one embodiment of the invention, using an Internet browser (e.g., Mozilla Firefox) or other client device (e.g., a mobile communications device or DVR), DVR users may log in to the DVR service provider's web site or other information system by providing, to the web site or other information system, (a) user identifiers (e.g., identities that uniquely identify DVR users, DVR service accounts, and/or DVR units) and (b) associated credentials (e.g., passwords). The DVR users may select one or more recommending entities from those listed on the DVR service provider's web page or DVR-presented screen. FIG. 6 shows an example of a DVR-presented screen that provides additional information about a selectable recommending entity, according to an embodiment of the invention. The screen shown in FIG. 6 provides descriptive information about the selectable recommending entity "Common Sense Media," and provides the DVR user with additional options, such as "Get this Guide," and "View Upcoming Programs." In one embodiment of the invention, a DVR user's selection of the "Get this Guide" option indicates that the DVR user has selected the recommending entity and wants to "subscribe" to the recommending entity's recommended suggestions. In one embodiment of the invention, a recommending entity may be mapped to multiple different lists of recommended suggestions, and a DVR user's selection of a particular recommending entity causes the user to be presented with a set of different lists that are mapped to the particular recommending entity. The user can then select any of the presented lists in which the user is interested.

For each recommending entity or list of recommended suggestions that a DVR user selects (e.g., by choosing "Get this Guide" from the menu shown on a screen such as that shown in FIG. 6), the DVR service provider may establish and store (e.g., in a database) a mapping between that user's DVR unit and one or more user-selected lists that have been mapped to that recommending entity. A particular DVR unit may be mapped to multiple lists of recommended suggestions, and a particular list of recommended suggestions may be mapped to multiple DVR units. In one embodiment of the invention, each DVR unit-to-list mapping also may indicate one or more user-selected exceptions to the list of recommended suggestions to which the mapping refers.

Figure 7:
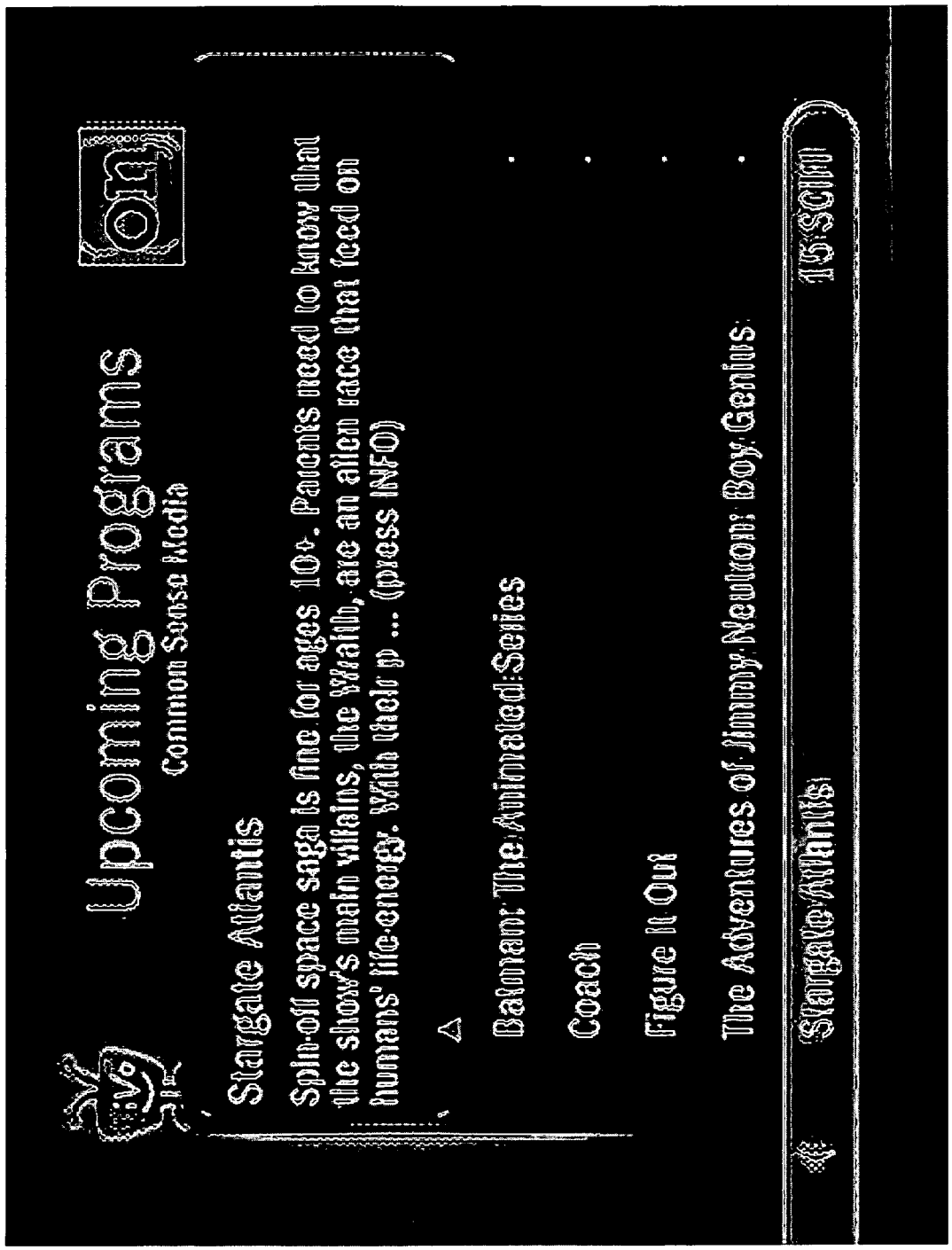
FIG. 7 shows an example of a DVR-presented screen that lists some of the recommended suggestions that are mapped to a particular recommending entity, according to an embodiment of the invention.

In one embodiment of the invention, a DVR user can view the lists of recommended suggestions that are mapped to a particular recommending entity prior to deciding whether to select any of the lists that are mapped to that recommending entity. Seeing the recommended suggestions that are mapped to a particular recommending entity may help the DVR user to decide whether or not to select or "trust" that recommending entity. For example, FIG. 7 shows an example of a DVR-presented screen that lists some of the recommended suggestions that are mapped to a particular recommending entity, according to an embodiment of the invention. The screen shown in FIG. 7 lists four of the programs that are contained in the list of recommended suggestions that are mapped to the "Common Sense Media" recommending entity. By selecting a specific recommended suggestion (as shown in FIG. 7, the recommended suggestion "Stargate Atlantis" is currently highlighted), a DVR user can receive descriptive information about that recommended suggestion, such as aspects of the recommended suggestion about which the recommending entity thinks that a DVR user should be aware. The descriptive information may be generated and provided by the recommending entity.

Periodically and/or in response to specified events, the DVR service provider may automatically determine, for each DVR unit that is associated with at least one list of recommended suggestions (via the selection process described above), a set of one or more "candidate" items for that DVR unit based at least in part on the lists of recommended suggestions that are mapped to that DVR unit. In one embodiment of the invention, the DVR service provider also may determine the set of candidate items based at least in part on one or more user-selected exceptions to the lists of recommended suggestions as described above. For example, the DVR service provider may query a database of available content items (e.g., identities of to-be-broadcasted and/or downloadable content items) to determine a set of candidate items that satisfy criteria that the recommended suggestions specify. The DVR service provider may store the set of candidate items determined for a particular DVR unit until the next time that the particular DVR unit synchronizes (e.g., via the Internet) with the DVR service provider. Alternatively, the DVR service provider may send the set of candidate items to the particular DVR unit immediately.

When a DVR unit synchronizes with the DVR service provider (which may occur on a periodic basis), the DVR service provider may transmit all new candidate items (those which have not yet been transmitted to the DVR unit) to the DVR unit. A scheduling mechanism operating within the DVR unit may prioritize and filter the new candidate items in view of content items that the DVR unit already has been scheduled to record. Based on this prioritizing and filtering, the scheduling mechanism may add one or more of the candidate items to a set of content items that the DVR unit is scheduled to record and/or download.

Thus, recommending entities other than the owners or users of a DVR may assist those owners and users in choosing content to record and/or download, if the owners or users desire such assistance. The DVR owners and users may "subscribe" to the recommended suggestions of recommending entities that the DVR owners and users know and trust and with whom the DVR owners and users share interests and/or values. Additionally, in one embodiment of the invention, users or owners of DVRs can "anti-subscribe" to recommended suggestions of selected recommending entities, so that the DVRs of those users or owners will prevent the recording of any content that the selected recommending entities recommend.

Embodiments of the invention summarized above are described below in greater detail, along with some alternative embodiments of the invention. Although embodiments of the invention described below are described in the context of DVRs, in alternative embodiments of the invention, devices other than DVRs may be substituted for, and may perform similar operations to those that are performed by, DVRs. For example, in an alternative embodiment of the invention, a radio (e.g., satellite radio) receiver and/or recorder may be designed to record audio content that has been suggested by a recommending entity to whose list of recommendations the radio's owner subscribes.

2.0 System Structural Overview

FIG. 1 is a block diagram that illustrates a system via which a DVR user can "subscribe" to a recommending entity's list of recommended recording and/or downloading suggestions, according to one embodiment of the invention. The system shown is only one of many different systems in which embodiments of the invention may be implemented. Other systems in which embodiments of the invention may be implemented may include more or fewer components than those shown in FIG. 1.

The system shown in FIG. 1 comprises a recommending entity's personal computer (PC) 104, Internet 102, a DVR service provider's web server 106, a database 118, a DVR user's PC 112, a DVR 108 (such as is described with reference to FIG. 5 below), a LAN 110, a televised content provider 116 (such as a broadcaster, satellite television provider, cable television provider, etc.), and a downloadable content provider's web server 114. DVR 108 and DVR user's PC 112 are both connected (either physically or wirelessly) to LAN 110. Typically, DVR 108, LAN 110, and DVR user's PC 112 all will be located in the same residence.

DVR 108 receives, records, and presents televised content that DVR 108 receives from televised content provider 116. LAN 110 is connected to Internet 102. Through LAN 110, DVR user's PC 112 and DVR 108 can communicate with other devices that are also connected to Internet 102. DVR service provider's web server 106 is also connected to Internet 102. DVR service provider's web server 106 and DVR 108 may communicate with each other via Internet 102 and LAN 110 using web service protocols. DVR user's PC 112 may execute an Internet browser application (e.g. Mozilla Firefox). DVR user's PC 112 and DVR service provider's web server 106 may communicate with each other via Internet 102 and LAN 110 using Hypertext Transfer Protocol (HTTP).

DVR service provider's web server 106 is connected to database 118. DVR service provider's web server 106 may store data into and retrieve data from database 118. Downloadable content provider's web server 114 is also connected to Internet 102. DVR 108 may download content (e.g., files) from downloadable content provider's web server 114 via Internet 102 and LAN 110 using protocols such as HTTP and File Transfer Protocol (FTP).

Recommending entity's PC 104 also is connected to Internet 102. Recommending entity's PC 104 can communicate with DVR service provider's web server 106 through Internet 102 using protocols such as HTTP. Recommending entity's PC 104 may execute an Internet browser application. Recommending entity's PC 104 may be a personal computer, a server, or any other kind of computing device. In one embodiment of the invention, a recommending entity creates a list of recommendations on his own PC and then sends those recommendations to an intermediate web server, which sends those recommendations to DVR service provider's web server 106.

3.0 Example Techniques

Figure 2:
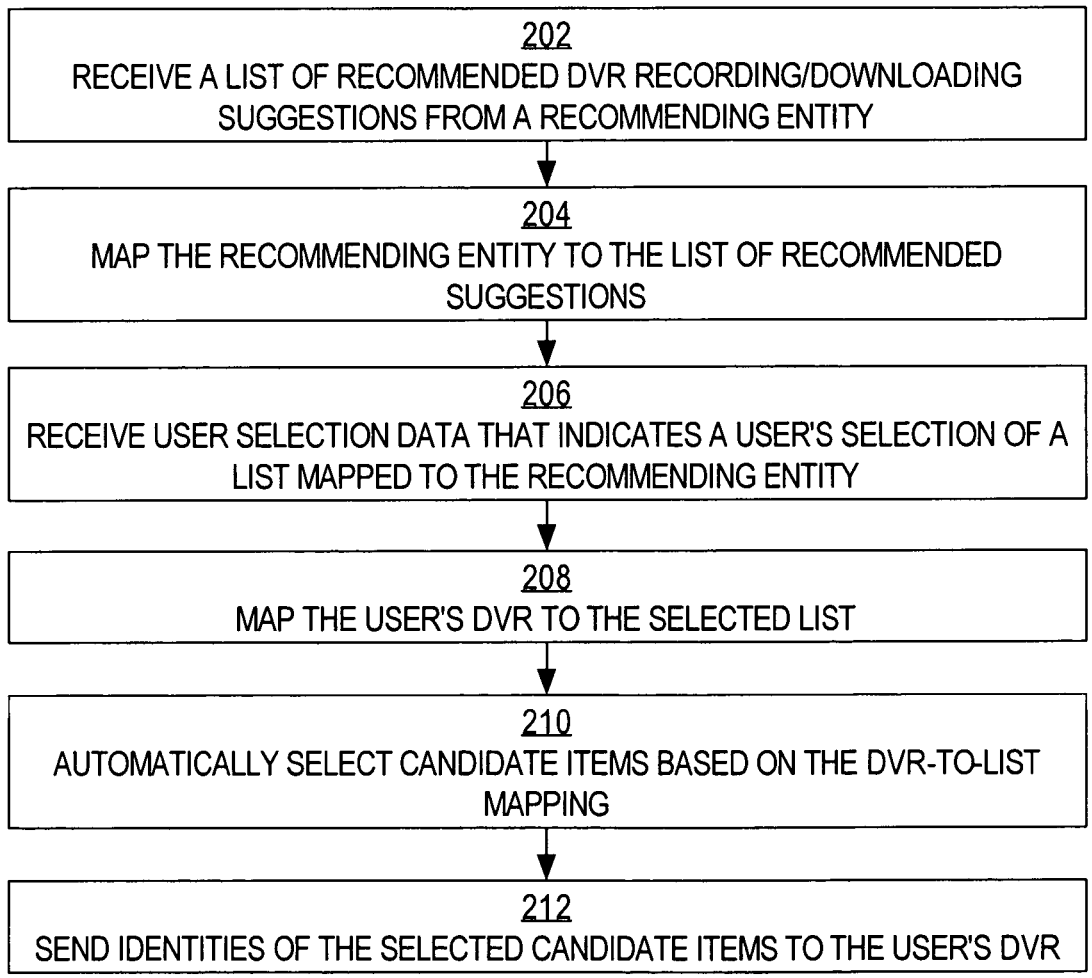
FIG. 2 is a flow diagram that illustrates the steps of a technique for enabling a DVR to use a recommending entity's recording and/or downloading suggestions, according to one embodiment of the invention.

FIG. 2 is a flow diagram that illustrates the steps of a technique for enabling a DVR to use a recommending entity's recording and/or downloading suggestions, according to one embodiment of the invention. In various alternative embodiments of the invention, more or fewer steps than those shown in FIG. 2 may be performed.

In block 202, a list of one or more recommended suggestions is received from a recommending entity. A DVR service provider may receive such a list, for example. A recommended suggestion may identify to-be-broadcasted content (e.g., a movie, an event, a televised series, an episode of a televised series, etc.) that the recommending entity suggests for future recording by a DVR. Additionally or alternatively, a recommended suggestion may identify downloadable content (e.g., a file located at a specified URL that is accessible through downloadable content provider's web server 114) that the recommending entity suggests for downloading by a DVR. Additionally or alternatively, a recommended suggestion may specify a search query that, when executed by a DVR, will cause a set of query-matching DVR-obtainable content to be determined.

For example, a recommending entity (e.g., the Parents Television Council) may submit such a list to a DVR service provider by (a) directing an Internet browser (on recommending entity's PC 104) to the URL of a webpage that is accessible through DVR service provider's web server 106, (b) entering the recommended suggestions into a form on the webpage, and (c) submitting the completed form to DVR service provider's web server 106. The list may be submitted via a web service provided the DVR service provider. DVR service provider's web server 106 may receive the list via Internet 102. Alternatively, a recommending entity may simply mail such a list to the DVR service provider's postal address. In this case, the DVR service provider may receive the list through the postal system.

A recommended suggestion may identify a single content item by channel and either title or starting and ending broadcast times, and/or by URL or other identifier (in the case of downloadable content), for example. A recommended suggestion may identify multiple episodes of a televised series by channel and title. A recommended suggestion may identify a keyword, an actor, and/or a director. A recommended suggestion that identifies a keyword, actor, or director actually may indirectly identify a set of content items that are associated with that keyword, actor, or director. For example, a recommended suggestion that identifies director Stanley Kubrick might indirectly identify content items that are titled "Eyes Wide Shut," "Full Metal Jacket," "The Shining," "A Clockwork Orange," "2001: Space Odyssey," "Dr. Strangelove," and "Spartacus," among others. A recommended suggestion may identify a specified rating (e.g., a number of stars), in which case the recommended suggestion may identify a set of content items that are associated with a rating that is at least as high as the specified rating. A recommended suggestion may identify a specified genre (e.g., horror, comedy, drama, action, fantasy, adventure, adult, etc.), in which case the recommended suggestion may identify a set of content items that are associated with that genre. A recommended suggestion may identify a duration (e.g., in minutes), in which case the recommended suggestion may identify a set of content items that are no longer in length, time-wise, than the duration or a set of content items that are no shorter in length, time-wise, than the duration, depending on the suggestion. A user may subscribe to recommended suggestions directly from a DVR. In one embodiment of the invention, a recommended suggestion may comprise a logical statement that includes one or more logical operators (e.g., "AND," "OR," "NOT," etc.) which link together, or indicate a relationship between, two or more sets of criteria. In such an embodiment of the invention, a recommended suggestion may identify a set of content items based on an evaluation of the suggestion's logical statement, including the logical operators.

In block 204, an identity of the recommending entity is mapped to the list received in block 202. Thus, an entity-to-list mapping is established. For example, a DVR service provider (either manually or automatically through DVR service provider's web server 106) may store, in database 118, a mapping between the entity's identity and the list of recommended suggestions that the DVR service provider received from the entity. In one embodiment of the invention, multiple different lists may be received from and mapped to the same recommending entity.

In block 206, user selection data is received. The user selection data indicates a DVR user's selection of a list of recommended suggestions that is mapped to a recommending selected recommending entity. An example of a set of recommending entities is shown in FIG. 5. For example, a user of DVR 108 may direct an Internet browser (executing on DVR user's PC 112) to a webpage that is accessible through DVR service provider's web server 106. This webpage (which may be dynamically generated in response to a request for that webpage) may list all of the recommending entities that have submitted lists of recommended suggestions to the DVR service provider (all of the recommending entities for which an entity-to-list mapping has been established in database 118, for example). Using his browser, the user may select a particular recommending entity. In one embodiment of the invention, the user may select multiple recommending entities. Typically, the selected recommending entity or entities will be those with whom the user is familiar, those whom the user trusts, or those with whose opinions the user essentially agrees. DVR service provider's web server 106 may receive, from the user, an identity of the selected entity or entities through Internet 102. After selecting one or more recommending entities, the user may select one or more lists from among the lists that are mapped to the selected recommending entities.

In block 208, an identity (or identities) of the lists, which are identified by the user selection data that was received in block 206, are mapped to a particular DVR that is associated with the user from whom the user selection data was received. Thus, at least one DVR-to-recommended suggestion list mapping is established. For example, during a log in process for the same session in which the user selects the recommending entity (or entities), the user might provide, to DVR service provider's web server 106, the user's identity, or an identity of the user's account, or an identity of DVR 108. Using the provided information and other information stored in database 118, DVR service provider's web server 106 may determine that the user is associated with DVR 108. DVR service provider's web server 106 may store, in database 118, a mapping between the selected list (or lists) and DVR 108.

In the mapping, DVR 108 may be identified by a DVR identifier with which no other DVR is associated. The DVR identifier might be located on a label that is attached to DVR 108, for example. The user might submit the DVR identifier to the DVR service provider at the time that the user registers DVR 108 and establishes an account with the DVR service provider; thus, database 118 might already contain a mapping between DVR 108 and the DVR's user. In one embodiment of the invention, DVR 108 is not owned or operated by the recommending entity.

In block 210, based at least in part on the DVR-to-list mapping established in block 208, one or more candidate items are automatically selected from among a set of content items. A candidate item may identify a specific showing (on a specific channel on a specific date at a specific time) of some to-be-broadcasted content. Alternatively, a candidate item may identify a URL of a file (e.g., a file that is located on downloadable content provider's web server 114).

For example, DVR service provider's web server 106 may determine one or more lists that are mapped to DVR 108 in database 118. For each recommended suggestion in each such list, DVR service provider's web server 106 may select one or more candidate items from database 118 based on that recommended suggestion.

For example, if a recommended suggestion identifies a specific content item (e.g., a specific showing of to-be-broadcasted content), then DVR service provider's web server 106 may select a candidate item that identifies that content item. If a recommended suggestion identifies a multi-episode series, then DVR service provider's web server 106 may select multiple candidate items, each of which identifies a separate episode of that series. If a recommended suggestion identifies a keyword, actor, or director, then DVR service provider's web server 106 may select multiple candidate items that identify to-be-broadcasted content that is associated with that keyword, actor, or director. If a recommended suggestion identifies a URL, then DVR service provider's web server 106 may select or create a candidate item that identifies that URL. Alternatively, the DVR service provider's web server 106 may send the recommended suggestion to DVR 108, and DVR 108 may select and/or search for candidate items based on the recommended suggestion.

In block 212, identities of the selected candidate items are sent to the particular DVR. For example, DVR service provider's web server 106 may send, to DVR 108, identities of the candidate items that were selected in block 210. DVR service provider's web server 106 may send the identities of the selected candidate items through Internet 102 using web service protocols, for example. DVR 108 may receive and store the identities of the selected candidate items. A scheduling mechanism executing on DVR 108 may automatically prioritize and filter the candidate items in view of content that DVR 108 is already scheduled to record. Those of the candidate items which pass the filtering (i.e., those which do not conflict with higher-priority content that DVR 108 is already scheduled to record) may be scheduled for recording.

If one or more of the selected candidate items identify URLs, then DVR 108 may automatically download and locally store the files that are located at those URLs. For example, DVR 108 may automatically download a file from downloadable content provider's web server 114 through Internet 102. The file may be a video file that a user of DVR 108 can later view at his convenience, for example.

In one embodiment of the invention, a webpage that DVR service provider's web server 106 sends to DVR user's PC 112 indicates each of the recommended suggestions of each of the selected recommending entities that are indicated in the user selection data (received in block 206). For example, the webpage might indicate identities of three televised series that a recommended entity suggests for recording. In one embodiment of the invention, the webpage additionally comprises controls which allow the user to "opt out" of one or more of the recommended suggestions. For example, next to each of the identities of the televised series, the webpage may display a checkbox that is checked by default, but which the user can uncheck in order to "opt out" of the corresponding series. Recommended suggestions that a user has "opted out" of may be noted in database 118, for example; the "opted out" of recommended suggestions may be mapped to the identity of the user's DVR. In one embodiment of the invention, candidate items are not selected (in block 210) based on any of those of the recommended suggestions that the user has "opted out" of. For example, if the user has unchecked the checkbox next to the identity of the second of the three televised series, then DVR service provider's web server 106 may select candidate items that are based on the first and third televised series, but not the second televised series. Thus, a user may further customize the recommendations of a recommending entity for the user's purposes if the user does not entirely agree with that entity's suggestions.

After a content item has been obtained by DVR 108 in response to a recommended suggestion as described above, a list of available-to-view content items that DVR 108 displays to the user may indicate, in addition to other information about that content item, some data that identifies the recommending entity whose recommendation caused DVR 108 to obtain that content item. For example, in a "now playing" list or menu, DVR 108 may display, next to a title of a content item obtained in the manner described above, an icon that was submitted by the recommending entity whose recommendation caused DVR 108 to obtain that content item. In one embodiment of the invention, a screen layout (including menu items, backgrounds, etc.) presented by the DVR 108 is specifically tailored by a recommending entity.

4.0 Recommended Suggestion-Dedicated DVRS

As is discussed above, techniques in various embodiments of the invention permit a DVR user to "subscribe" to the recommended suggestions of one or more user-selected recommending entities. Depending on scheduling constraints and conflicts, the DVR user's DVR may automatically record programs that are included in the recommended suggestion lists of the recommending entities that the DVR user has selected. However, in at least one embodiment of the invention, this does not prevent a DVR user from also scheduling the recording of programs that are not included in any recommended suggestion list of any recommending entity that the DVR user has selected.

There may be circumstances under which it is desirable to restrict the content that can be recorded, downloaded, and/or viewed through a DVR. For example, an elementary school might own several DVRs that the elementary school desires to use to automatically record educational programs. The elementary school might want to ensure that the DVRs cannot be used to view or record or download content that is not educational, and/or content that is inappropriate for viewing by elementary school students.

Therefore, in one embodiment of the invention, a DVR provides a user-selectable option that places the DVR in a "recommended suggestion-dedicated" mode of operation. The DVR might require a user to submit an authorized password in order to set the DVR in this mode or to set the DVR in a different mode once the DVR has been set in this mode. According to one embodiment of the invention, while the DVR is in the "recommended suggestion-dedicated" mode, the DVR is prevented from recording or downloading any content that is not contained in the recommended suggestions of at least one recommending entity that a DVR user has selected. Thus, elementary school children may be prevented from instructing a DVR to record or download content that a teacher-selected recommending entity has not suggested. According to one embodiment of the invention, while the DVR is in the "recommended suggestion-dedicated" mode, additional recommending entities cannot be selected and added to the DVR's selected recommending entity list without the submission of an authorized password. Thus, elementary school children may be prevented from adding, to the selected recommending entity list that is associated with a DVR, recommending entities of which a teacher would not approve.

According to one embodiment of the invention, while a DVR is in the "recommended suggestion-dedicated" mode, the DVR cannot be used to watch live television unless that live television consists of a program that the DVR is currently recording. For example, while in the "recommended suggestion-dedicated" mode, the DVR might be prevented from displaying any content that the DVR is not currently recording or has not already recorded. Thus, elementary school children may be prevented from using the DVR to tune to a channel that is presenting a program that is not within any of the recommended suggestions of any of the teacher-selected recommending entities.

5.0 Example Dvr

Figure 3:
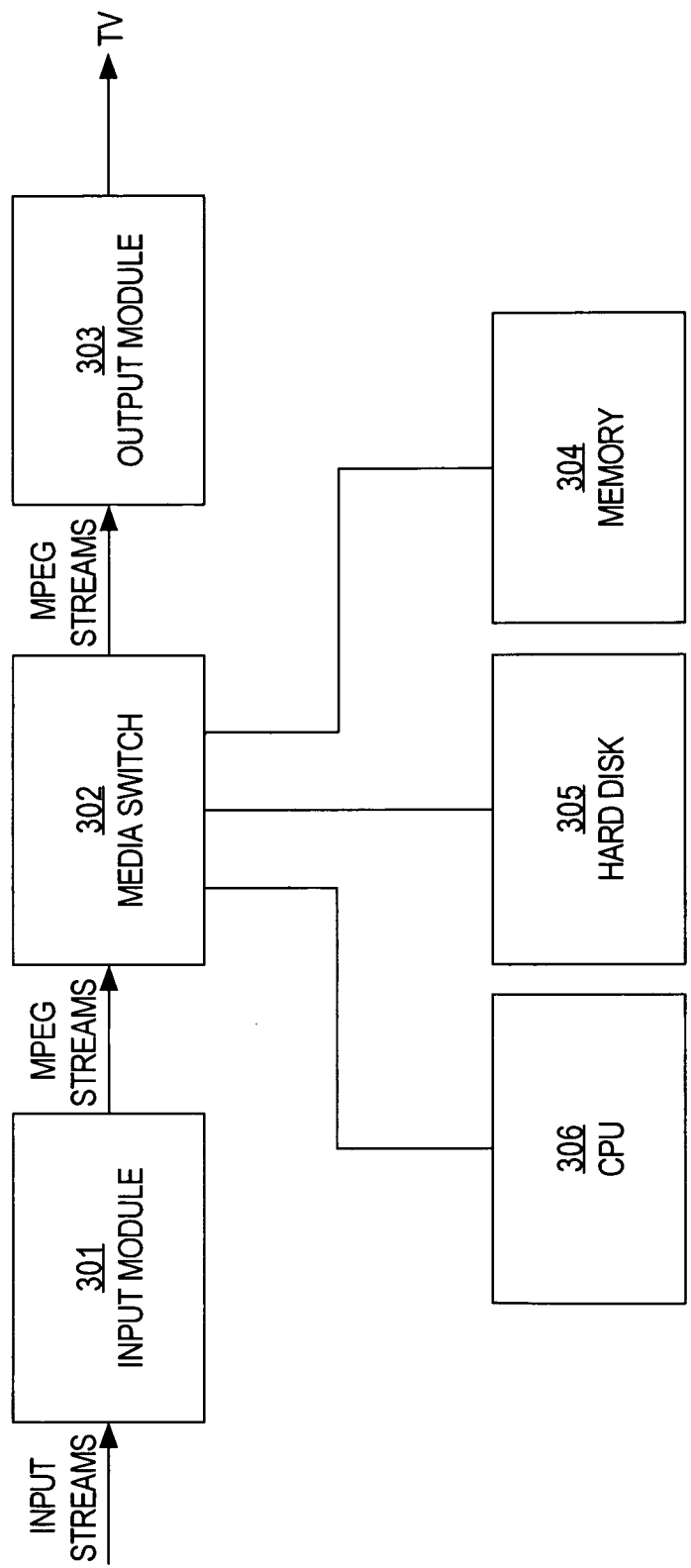
FIG. 3 is a block diagram that shows an example of the internal structure and operation of a DVR, according to an embodiment of the invention.

FIG. 3 is a block diagram that shows an example of the internal structure and operation of a DVR, according to an embodiment of the invention. An example of the internal structure and operation of a DVR is further described in U.S. Pat. No. 6,233,389, which is incorporated by reference as though originally disclosed herein.

The DVR shown in FIG. 3 comprises an input module 301, a media switch 302, and an output module 303. Input module 301 receives television (TV) input streams in any of a variety of forms. For example, a TV input stream received by input module 301 may take the form of a National Television Standards Committee (NTSC) compliant signal or a PAL compliant broadcast signal. For another example, a TV input stream received by input module 301 may take a digital form such as a Digital Satellite System (DSS) compliant signal, a Digital Broadcast Services (DBS) compliant signal, or an Advanced Television Standards Committee (ATSC) compliant signal. DBS, DSS, and ATSC are based on standards called Moving Pictures Experts Group 2 (MPEG-2) and MPEG-2 Transport. MPEG-2 Transport is a standard for formatting the digital data stream from the TV source transmitter so that a TV receiver can disassemble the input stream to find programs in the multiplexed signal. According to one embodiment of the invention, input module 301 produces MPEG streams. According to another embodiment of the invention, input module 301 produces streams that are encoded using a different codec.

An MPEG-2 transport multiplex supports multiple programs in the same broadcast channel, which multiple video and audio feeds and private data. Input module 301 tunes the channel to a particular program, extracts a specified MPEG stream from the channel, and feeds the MPEG stream to the rest of the system. Analog TV signals are encoded into a similar MPEG format using separate video and audio encoders, such that the remainder of the system is unaware of how the signal was obtained. Information may be modulated into the vertical blanking interval (VBI) of the analog. TV signal in a number of standard ways; for example, the North American Broadcast Teletext Standard (NABTS) may be used to modulate information onto certain lines of an NTSC signal, which the FCC mandates the use of a certain other line for closed caption (CC) and extended data services (EDS). Such signals are decoded by input module 301 and passed to the other modules as if the signals had been delivered via an MPEG-2 private data channel.

Media switch 302 mediates between a microprocessor CPU 306, a hard disk or storage device 305, and memory 304. Input streams are converted to an MPEG stream and sent to media switch 302. Media switch 302 buffers the MPEG stream into memory 304. Media switch 302 then performs two operations if the DVR user is watching real-time TV: media switch 302 sends the MPEG stream to output module 303 and simultaneously writes the MPEG stream to hard disk or storage device 305.

Output module 303 receives MPEG streams as input and produces an analog TV signal according to NTSC, PAL, or other TV standards. Output module 303 comprises an MPEG decoder, an on-screen display (OSD) generator, an analog TV encoder, and audio logic. The OSD generator allows the program logic to supply images which may be overlaid on top of the resulting TV analog signal. Additionally, output module 303 can modulate information supplied by the program logic onto the VBI of the output signal in a number of standard formats, including NABTS, CC, and EDS.

6.0 Hardware Overview

Figure 4:
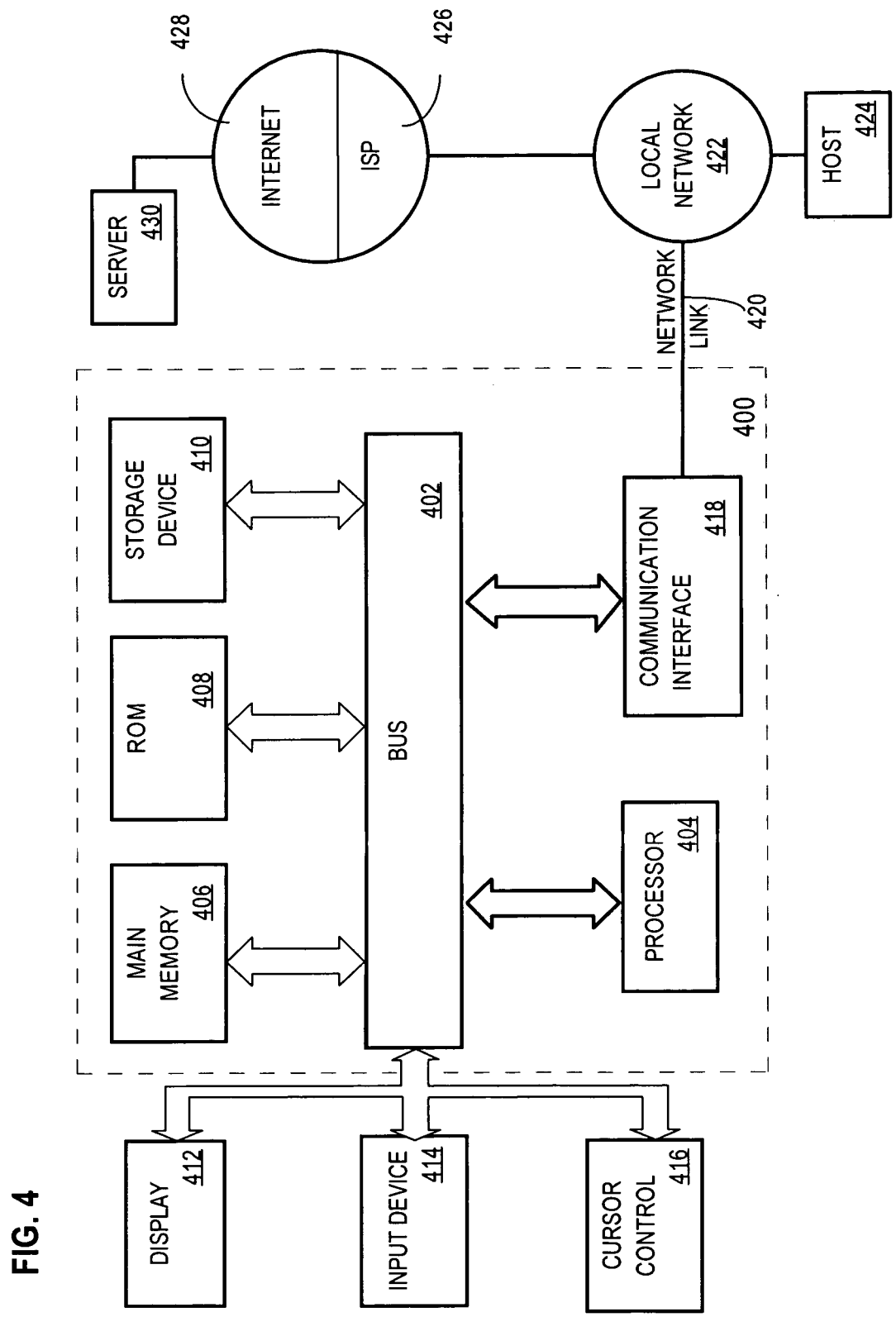
FIG. 4 is a block diagram of a system on which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
allowing a device, in a first mode, to display live content regardless of whether the live content was previously scheduled for recording;
while the device is in the first mode, receiving user input that selects one or more recommending entities from a plurality of recommending entities;
scheduling one or more content recordings based on one or more sets of recommended items from the selected one or more recommending entities;
setting the device from the first mode to a second mode of operation based on input received from a user, wherein the second mode is different from the first mode;
while the device is in the second mode:
preventing, by the device, recording of any content that is not indicated within at least one of the one or more sets of recommended items from the selected one or more recommended entities;
preventing, by the device, display of any content that is not in the one or more content recordings scheduled based on the one or more sets of recommended items from the selected one or more recommended entities;
wherein the device comprises a processor.

2. The method of claim 1, wherein at least one recommending entity, of the selected one or more recommending entities, is other than a user who operates the device.

3. The method of claim 1, further comprising automatically recording content that is specified within at least a first set of the one or more recommended items, the first set being from a first recommending entity, of the selected one or more recommending entities, other than a user from who operates the device.

4. A non-transitory computer-readable medium storing instructions which, when executed by one or more processors, cause the one or more processors to perform steps comprising:
allowing a device, in a first mode, to display live content regardless of whether the live content was previously scheduled for recording;
while the device is in the first mode, receiving user input that selects one or more recommending entities from a plurality of recommending entities;
scheduling one or more content recordings based on one or more sets of recommended items from the selected one or more recommending entities;
setting the device from the first mode to a second mode of operation based on input received from a user, wherein the second mode is different from the first mode;
while the device is in the second mode:
preventing, by the device, recording of any content that is not indicated within at least one of the one or more sets of recommended items from the selected one or more recommended entities;
preventing, by the device, display of any content that is not in the one or more content recordings scheduled based on the one or more sets of recommended items from the selected one or more recommended entities.

5. A non-transitory computer-readable medium as recited in claim 4, wherein at least one recommending entity, of the selected one or more recommending entities, is other than a user who operates the device.

6. A non-transitory computer-readable medium as recited in claim 4, the steps further comprising: automatically recording content that is specified within at least a first set of the one or more recommended items, the first set being from a first recommending entity, of the selected one or more recommending entities, other than a user from who operates the device.

7. The method of claim 1, further comprising, while the device is in the second mode, preventing selection of additional recommending entities from which to receive recommended items.

8. The method of claim 1, further comprising: while the device is in the second mode, scheduling one or more additional content recordings that are indicated by the one or more sets of recommended items.

9. The non-transitory computer-readable medium as recited in claim 4, the steps further comprising, while the device is in the second mode, preventing selection of additional recommending entities from which to receive recommended items.

10. The non-transitory computer-readable medium as recited in claim 4, the steps further comprising: while the device is in the second mode, scheduling one or more additional content recordings that are indicated by the one or more sets of recommended items.

11. An apparatus comprising:
a subsystem, implemented at least partially in hardware, configured to allow a device, in a first mode, to display live content regardless of whether the live content was previously scheduled for recording;
a subsystem, implemented at least partially in hardware, configured to schedule one or more content recordings based on one or more sets of recommended items from one or more recommending entities, the one or more recommending entities having been selected by user input while the device is in the first mode, the user input selecting the one or more recommending entities from a plurality of recommending entities;
a subsystem, implemented at least partially in hardware, configured to set the device from the first mode to a second mode of operation based on input received from a user, wherein the second mode is different from the first mode;
a subsystem, implemented at least partially in hardware, configured to, while the device is in the second mode:
prevent recording of any content that is not indicated within at least one of the one or more sets of recommended items from the selected one or more recommended entities;
prevent display of any content that is not in the one or more content recordings scheduled based on the one or more sets of recommended items from the selected one or more recommended entities.

12. The apparatus of claim 11, wherein at least one recommending entity, of the selected one or more recommending entities, is other than a user who operates the device.

13. The apparatus of claim 11, further comprising a subsystem, implemented at least partially in hardware configured to automatically record content that is specified within at least a first set of the one or more recommended items, the first set being from a first recommending entity, of the selected one or more recommending entities, other than a user from who operates the device.

14. The apparatus of claim 11, further comprising a subsystem configured to, while the device is in the second mode, prevent selection of additional recommending entities from which to receive recommended items.

15. The apparatus of claim 11, further comprising:
a subsystem, implemented at least partially in hardware configured to, while the device is in the second mode, the device to schedule one or more additional content recordings that are indicated by the one or more sets of recommended items.

16. The method of claim 1, wherein at least a first set of the one or more sets of recommended items indicates recommended programs, at least in part, using a combination of criteria and logical operators.

17. The non-transitory computer-readable medium as recited in claim 4, wherein at least a first set of the one or more sets of recommended items indicates recommended programs, at least in part, using a combination of criteria and logical operators.

18. The apparatus of claim 11, wherein at least a first set of the one or more sets of recommended items indicates recommended programs, at least in part, using a combination of criteria and logical operators.

19. The method of claim 1, further comprising:
sending, from a web server, to a client, one or more web pages that identify the plurality of recommending entities;
receiving the user input and an identifier for the device at the web server from the client.

20. The method of claim 1, further comprising:
receiving the user input at a server;
identifying the one or more sets of recommended items at the server;
sending the one or more sets of recommended items from the server to the device.

21. The non-transitory computer-readable medium as recited in claim 4, the steps further comprising:
sending, from a web server, to a client, one or more web pages that identify the plurality of recommending entities;
receiving the user input and an identifier for the device at the web server from the client.

22. The non-transitory computer-readable medium as recited in claim 4, the steps further comprising:
receiving the user input at a server;
identifying the one or more sets of recommended items at the server;
sending the one or more sets of recommended items from the server to the device.

23. The apparatus of claim 11, further comprising:
a subsystem, implemented at least partially in hardware, configured to display one or more screens that identify the plurality of recommending entities;
a subsystem, implemented at least partially in hardware, configured to receive the user input in response to the displaying of the one or more screens that identify the plurality of recommending entities.

24. The apparatus of claim 11, further comprising a subsystem, implemented at least partially in hardware, configured to receive one or more sets of recommended items from a server, wherein the server is configured to receive the user input and identify the one or more sets of recommended items for the device based on the user input.

* * * * *